Oct. 28, 1947.   R. M. REDHEFFER   2,429,843
DEVICE FOR MEASURING ELECTROMAGNETIC FIELD INTENSITY
Filed Jan. 17, 1946
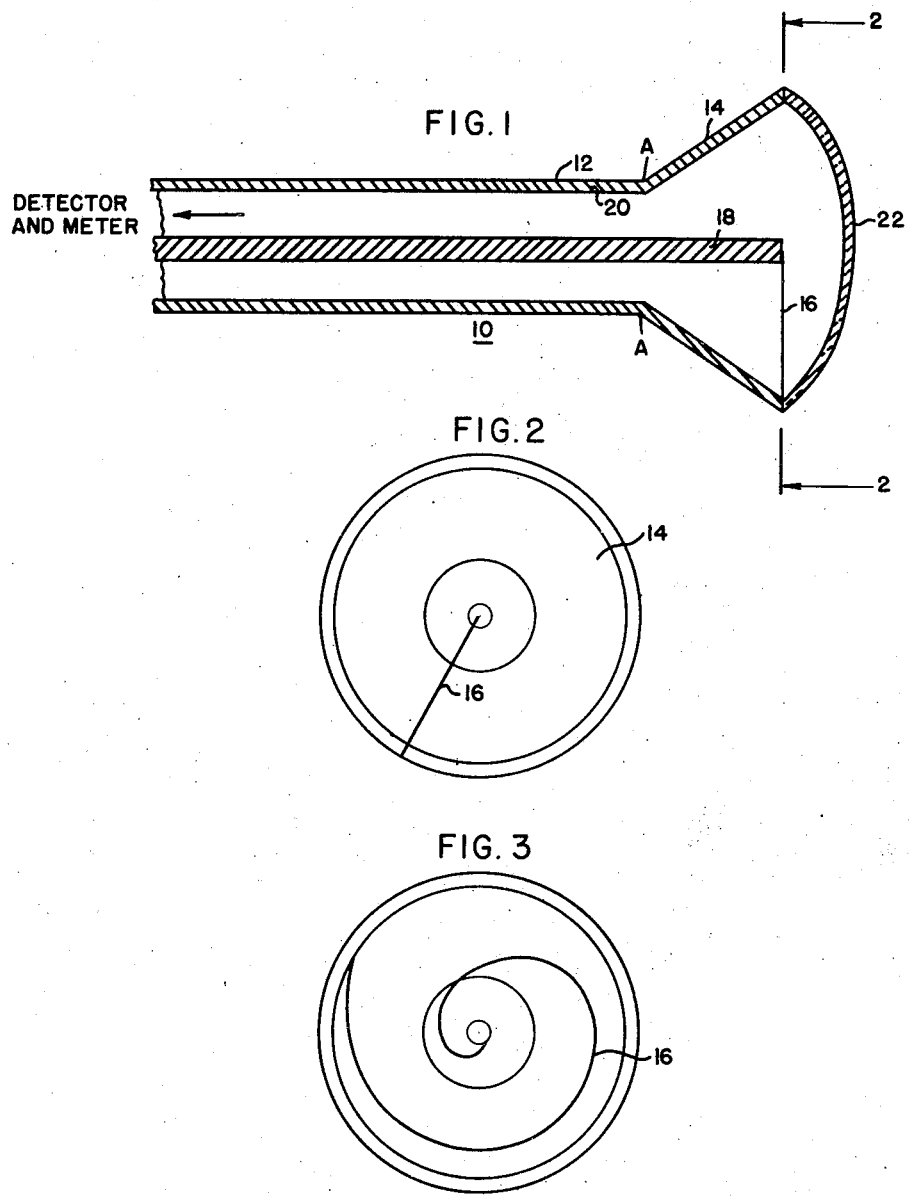
INVENTOR.
RAYMOND M. REDHEFFER
BY
William P. Hall.
ATTORNEY Patented Oct. 28, 1947

2,429,843

UNITED STATES PATENT OFFICE 2,429,843

DEVICE FOR MEASURING ELECTROMAGNETIC FIELD INTENSITY

Raymond M. Redheffer, Cambridge, Mass., assignor, by mesne assignments, to the United States of America, as represented by the Secretary of War Application January 17, 1946, Serial No. 641,831

2 Claims. (Cl. 175—183)

This invention relates to an electrical measurement device, and more particularly to a device for measuring electrical field strength.

An object of the invention is to explore or measure electrical field strength, for example, the field strength of a radio frequency wave energy field.

It is known to use a so-called dipole probe to measure radio frequency electric field strength. To be effective, however, the probe must be of appropriate size. For very high frequencies, this results in the probe being large enough in terms of the wavelength to act as a disturbing factor in the field under observation. It is a further object of this invention, therefore, to provide an electric field measurement probe of such size as to present little or no reflection coefficient perceptible to the radio frequency wave energy being measured.

A feature of the invention comprises the use of a radio frequency measuring probe of very fine wire, sensitive to minute changes in power amplitude, while at the same time absorbing little of the high frequency wave energy being propagated.

In accordance with the invention, a radio frequency measuring device or probe may comprise a suitable length of coaxial line of small cross-sectional dimension, terminating in a flaring portion in which, between the inner and outer conductors, is mounted a very fine wire, for example, a Wollaston wire.

A more complete understanding of this invention will be obtained from the detailed description that follows, taken in conjunction with the appended drawing, wherein:

Fig. 1 is a cross-sectional view of an embodiment of the invention;

Fig. 2 is an end view of the device of Fig. 1, taken along the line 2—2 thereof; and Fig. 3 shows a modification of the device of Figs. 1 and 2.

With reference to the drawing, there is shown a radio frequency measuring probe 10 for use in exploring or measuring radio frequency field strength which comprises a length of very small diameter coaxial line 12, terminating at one end in an outwardly flaring portion 14. A very fine wire 16, for example, a Wollaston wire, is mounted at the large end of the flaring portion, the ends of the wire being secured to the central and outer conductors 18, 20 of the coaxial line, the wire following a straight line or radial path between the conductors of the coaxial line, as illustrated in Fig. 2. A protective, hemispherical cover or shield 22 of any suitable material, for example, glass, may be provided over the wire end of the probe. The Wollaston wire, being of very small diameter, is sensitive to very small changes in power amplitude, making it possible for the detector to indicate the modulations of the radio frequency carrier wave and at the same time absorbing very little of the radio frequency wave energy being propagated when the probe is inserted in the radio frequency field. The probe dimensions may be quite small, for example, a device constructed in accordance with the invention had a dimension in the region of the line A—A of approximately $\frac{1}{16}$ inch, and an outer dimension in the region of the line 2—2 of approximately $\frac{3}{16}$ inch. With the arrangement of Fig. 2, the probe has a definite polarization. The probe may be made independent of polarization, however, by having the wire 16 follow a spiral path between the inner and outer conductors of the coaxial line as illustrated by Fig. 3.

Although the invention has been described with reference to specific arrangements, it is to be understood that it is not restricted thereto, but is limited in scope only by the prior art and the appended claims.

What is claimed is:

1. A radio frequency probe for exploring the strength of a field of electromagnetic energy of radio frequency comprising a coaxial line, one end of which is to be inserted in the radio frequency field, the outer conductor of said line having an outward flare at said one end, and a Wollaston wire spiralling outwardly connecting the center to said outer conductor at said one end.

2. An electrical device for measuring electromagnetic field intensity comprising a coaxial line of very small cross-sectional dimension, one end of which line is adapted to be inserted in the electric field, and a very fine wire extending spirally between and secured to the conductors of said coaxial line at said one end of the line.

RAYMOND M. REDHEFFER.

REFERENCES CITED

The following references are of record in the file of this patent:

UNITED STATES PATENTS

| Number | Name | Date |
|---|---|---|
| 2,399,481 | George | Apr. 30, 1946 |
| 2,399,674 | Harrison | May 7, 1946 |
| 2,405,814 | Brannin | Aug. 13, 1946 |